(12) United States Patent
Srivastava et al.

(10) Patent No.: US 10,565,316 B2
(45) Date of Patent: Feb. 18, 2020

(54) ASSESSING COMPLEXITY OF DIALOGS TO STREAMLINE HANDLING OF SERVICE REQUESTS

(71) Applicant: International Business Machines Corporation, Armonk, NY (US)

(72) Inventors: Biplav Srivastava, Yorktown Heights, NY (US); Qingzi Vera Liao, Yorktown Heights, NY (US); Pavan Kapanipathi Bangalore, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/048,526

(22) Filed: Jul. 30, 2018

(65) Prior Publication Data

US 2018/0365213 A1    Dec. 20, 2018

Related U.S. Application Data

(63) Continuation of application No. 15/582,096, filed on Apr. 28, 2017, now Pat. No. 10,114,816.

(51) Int. Cl.
*G10L 15/00* (2013.01)
*G06F 17/27* (2006.01)
*H04M 3/51* (2006.01)
*G10L 15/01* (2013.01)

(52) U.S. Cl.
CPC ........ *G06F 17/279* (2013.01); *G06F 17/2775* (2013.01); *G10L 15/01* (2013.01); *H04M 3/5175* (2013.01)

(58) Field of Classification Search
CPC .................................. G10L 15/01; G06F 17/27
USPC .............................................................. 704/9
See application file for complete search history.

(56) References Cited

U.S. PATENT DOCUMENTS

| 10,346,542 | B2 * | 7/2019 | Wooters | ................. G06F 17/28 |
| 2009/0306995 | A1 | 12/2009 | Weng et al. | |
| 2014/0067375 | A1 | 3/2014 | Wooters | |
| 2014/0270145 | A1 | 9/2014 | Erhart et al. | |
| 2017/0214799 | A1 * | 7/2017 | Perez | ................. H04M 3/5235 |

OTHER PUBLICATIONS

United States Notice of Allowance dated Jun. 12, 2018 in U.S. Appl. No. 15/582,096.
United States Office Action dated Feb. 5, 2018 in U.S. Appl. No. 15/582,096.
Mel, et al. "The NIST Definition of Cloud Computing". Recommendations of the National Institute of Standards and Technology. Nov. 16, 2015.

* cited by examiner

*Primary Examiner* — Daniel Abebe
(74) *Attorney, Agent, or Firm* — Anthony Curro, Esq.; McGinn IP Law Group, PLLC

(57) ABSTRACT

A dialogue complexity assessment method, system, and computer program product for introducing the notion of dialogue complexity to understand and compare dialogues in a repository, calculating the dialogue complexity, use the dialogue complexity to understand customer interactions in a variety of domains using public and proprietary data, and demonstrate the dialogue complexity usage to improve a service management operation.

20 Claims, 7 Drawing Sheets

US 10,565,316 B2

ASSESSING COMPLEXITY OF DIALOGS TO STREAMLINE HANDLING OF SERVICE REQUESTS

CROSS-REFERENCE TO RELATED APPLICATIONS

The present application is a Continuation Application of U.S. patent application Ser. No. 15/582,096, filed on Apr. 28, 2017, the entire contents of which are hereby incorporated by reference.

BACKGROUND

The present invention relates generally to a dialogue complexity assessment method, and more particularly, but not by way of limitation, to a system, method, and computer program product for determining complexity as a data-driven, context-independent indicator to manage sets of dialogs and services operations.

Service industry thrives on engaged customers using a company's offerings, and dialogs, whether written or spoken, is a common form of such an interaction. Over time, organizations collect a sizable volume of dialogue data that may be proprietary or public depending on how customer service is provided.

As a customer calls up their service provider for a request, their interaction may be routine or extra-ordinary. Recently, there has been significant interest in the service management domain to automatically analyze such interaction data to better understand customer needs and ways to address them. For example, conventional techniques have considered tracking high-level indicators such as sentiments about how customer interactions are progressing in a service center and enable managers to take pro-active actions.

Thus, there is a need in the art for a dialogue complexity measure to characterize interactions with customers at the levels of utterances, turns and overall dialogs using dialogue data from online repositories as well as contact centers of service providers.

SUMMARY

In an exemplary embodiment, the present invention can provide a computer-implemented dialogue complexity assessment method, the method including calculating staged measures of a complexity of a dialogue by: computing the complexity of the dialogue at an utterance level, computing the complexity of the dialogue at a turn level, and using the two complexity measures to compute the aggregate complexity of the dialogue. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
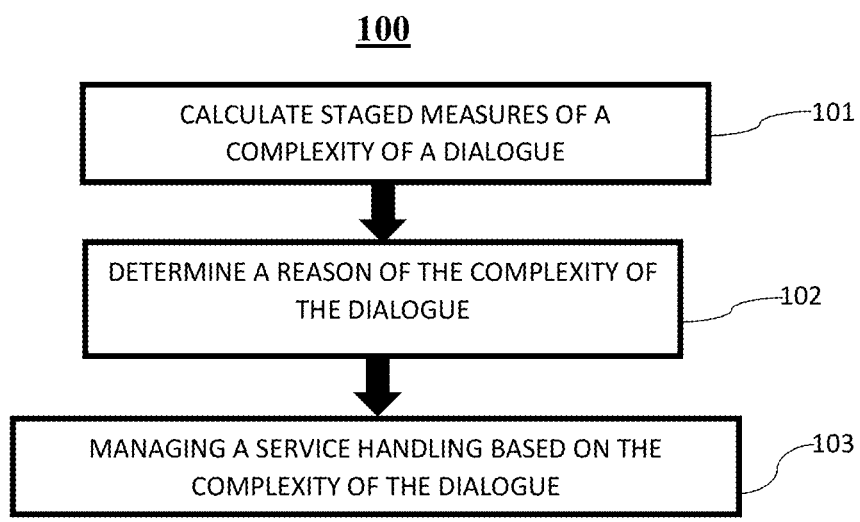
FIG. 1 exemplarily shows a high-level flow chart for a dialogue complexity assessment method 100 according to an embodiment of the present invention.

The invention will now be described with reference to FIGS. 1-7, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a dialogue complexity assessment method 100 according to the present invention can include various steps for calculating a complexity of a dialogue, determining a reason for the complexity, and manage a service handling.

Figure 5:
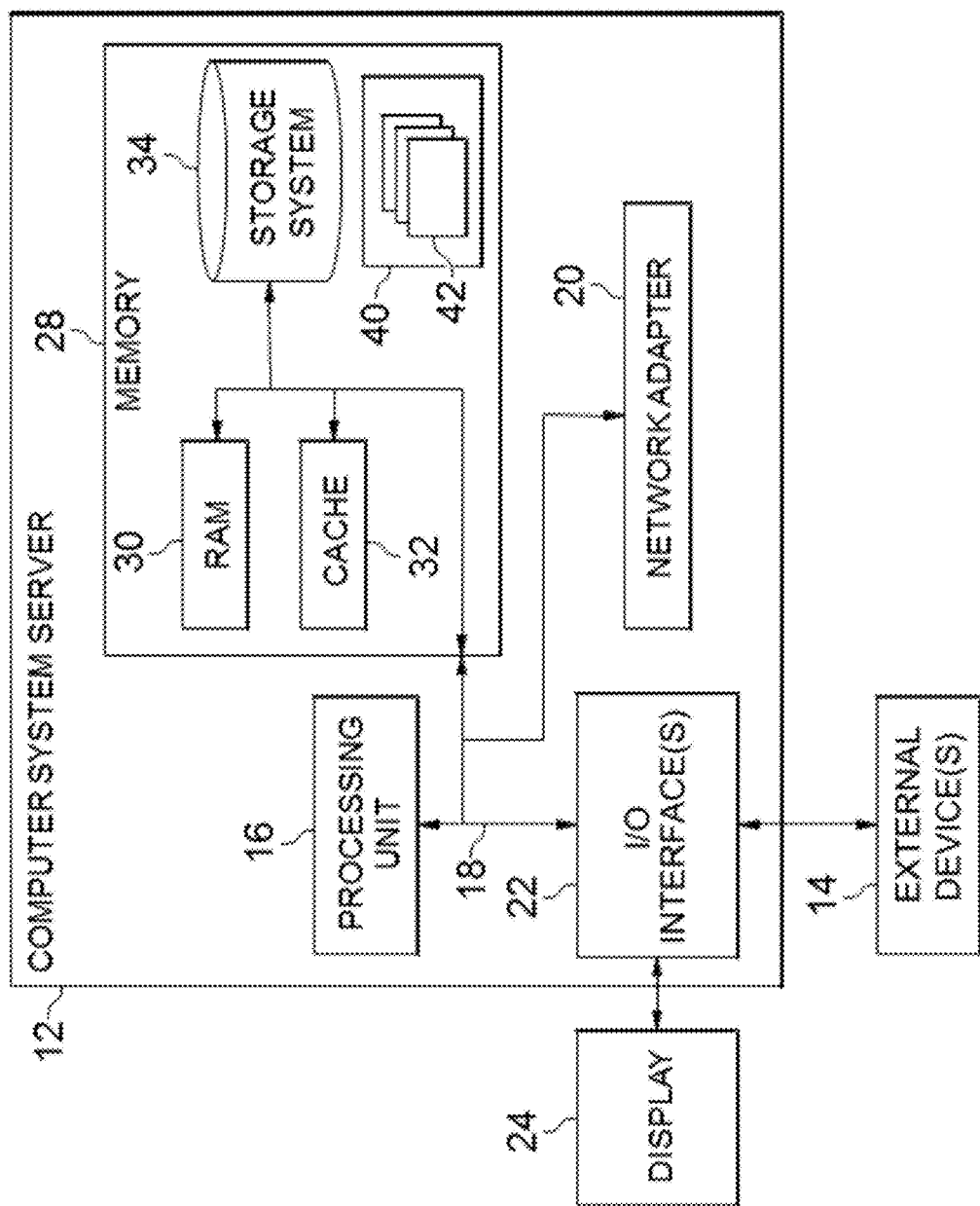
FIG. 5 depicts a cloud-computing node 10 according to an embodiment of the present invention.

By way of introduction of the example depicted in FIG. 5, one or more computers of a computer system 12 according to an embodiment of the present invention can include a memory 28 having instructions stored in a storage system to perform the steps of FIG. 1.

Although one or more embodiments may be implemented in a cloud environment 50 (see e.g., FIG. 6), it is nonetheless understood that the present invention can be implemented outside of the cloud environment.

With reference generally to FIGS. 1-4, dialogue is made up of a series of turns, where each turn is a series of utterances by one or more participants playing one or more roles. In the example of customer support center, a user contacts a service center and enters into a dialogue with a customer support agent. The participant roles here are that of a customer and an agent, and the roles inter-leave in every turn. On the other hand, in the example of online support, a person may raise an issue on a public portal and anyone may reply. The role of all participants here is that of a portal user because the original user request may remain unresolved. Each user utterance in such a case of single role to define a new turn.

Referring now to FIG. 1, in step 101, staged measures of a complexity of a dialogue are calculate. That is, the complexity of the dialogue is calculated by computing the complexity at an utterance level, at a turn level, and then at a dialogue level based on the turn level and utterance level complexity.

The desiderata from a dialogue complexity measure are that it can be automatically calculated, can be agnostic to representation (e.g., attributes, values, entities) and yet be able to incorporate them where available, can allow comparison of dialogues, be easy to interpret source of complexity, be compassable over dialogue structure to allow computation ease and any relative weighing, and support boundary condition properties.

The boundary conditions are complexity of an utterance with less participants should be less than or equal to the same utterance with more participants and complexity of an utterance with less complex words should be less than or equal to the same utterance with more complex words.

The complexity of the utterance level is computed where a word phrase $w_i$, denoted $c(w_i)$, is defined by following terms calculated in the given order:

$$c(w_i) = \begin{cases} 1 & |w_i \in DS \\ 0.5 & |w_i \in ES \\ 0 & |w_i \in SWL \end{cases} \quad (1)$$

where SWL represent the set of stop words, ES stand for the set of English subset (common words), DS for domain specific words/phrases and rest of the words are part of noise set NS. An utterance U consists of word phrases $w_i$ such that $|U|=N_U^\omega=\Sigma_1^{|U|}\omega_i$.

The complexity of an utterance, denoted c(U), is defined as:

$$c(U) = \frac{\sum_{i=1}^{|U|} c(w_i)}{|U|} \quad (2)$$

A turn is a collection of utterances where each role gets to speak at least once. For a 2-role dialogue, a turn consists of two utterances. Two equations (3) and (4) of turn complexity are proposed. The first one is averaging utterances within a turn, calculated by:

$$c(T) = \frac{\sum_{i=1}^{|T|} c(U_i)}{|T|} \quad (3)$$

where the number of utterances $U_i$ within the turn T is denoted by |T|. Since turn complexity can be seen as a way to reflect the complexity of interactions at the moment of the turn, in an-other definition, dialogue acts tag to calculate a weighted sum of utterance complexity. Dialog acts are tags that indicate the communicative function of the utterance. For example, an utterance may intend for requesting information, providing information, or for social functions such as greetings or closing the dialogue. Dialog act can be both manually or automatically tagged.

The weighted turn complexity is calculated by:

$$c(T_{DA}) = \frac{\sum_{i=1}^{|T|} c(U_i) * w^{\alpha(U_i)}}{|T|} \quad (4)$$

where a function $\alpha(U_i)$ is available to get the dialogue act tag for utterance $U_i$. Further, for each dialogue act j, its weight is denoted by $w_j$ (in 0-1 range). The utterance and turn complexity measures defined above look at the content of interaction. To measure complexity at a dialogue level, both the content and its structure are allowed to be considered. Thus, two components are available in the calculation: average turn complexity to reflect the content complexity, and the length of the dialogue relative to the maximum length in the dialogue dataset of that kind. The latter component can be seen as reflecting the structural complexity (length) of the particular dialogue relative to the maximum structural complexity (length) that the service context allows. While the dialogue length is used as a simple indicator, more sophisticated structural features can be introduced. One can weigh these independent components to arrive at the total dialogue complexity.

$$c_D = c(D) = w_1 * \frac{\sum_{i=1}^{N(t)} c(T_i)}{N_D^T} + w_2 * \frac{N_D^T}{N_D^{T_{max}}} \quad (5)$$

where the number of turns $T_i$ in the dialogue D by $|D|=N_D^T$. Let $N_D^{T_{max}}$ be the maximum number of turns per dialogue in the dataset S ($D_i \in S$).

If $w_2=0$ is used, content is only considered. However, in embodiments of the invention, equal weight to both with w1=w2=0.5.

Thereby, the overall dialogue complexity can be calculated by aggregating turn complexities by, for example, using a weighted sum of turn complexities, using a weighted decay based on estimated length of dialog, and using machine learning based methods such as supervised learning using human-annotation of dialogue complexity and predicting dialogue length, decay parameter, etc.

Thus, the proposed metric is compositional, and uses available dialogue content and structure. In traditional analysis of dialogs from linguistics point of view, the focus is on read-ability of dialogs. The disclosed complexity measure focuses on word selection and the meaning(s) they may convey. One can conceive more advanced metrics such as by estimating the ability of a person to use the dialogue to perform a particular task better, provided additional data is available conveying signals about goodness of task accomplished.

It is noted that the complexity calculation makes distinction between domain specific terms, common language (English) terms and stop words, that do not convey significant meaning. When analyzing utterances, the method can use single words, and in other embodiments, multi-word phrases or more generally, N-gram structure, i.e., a sliding window of N-neighboring words.

Figure 2:
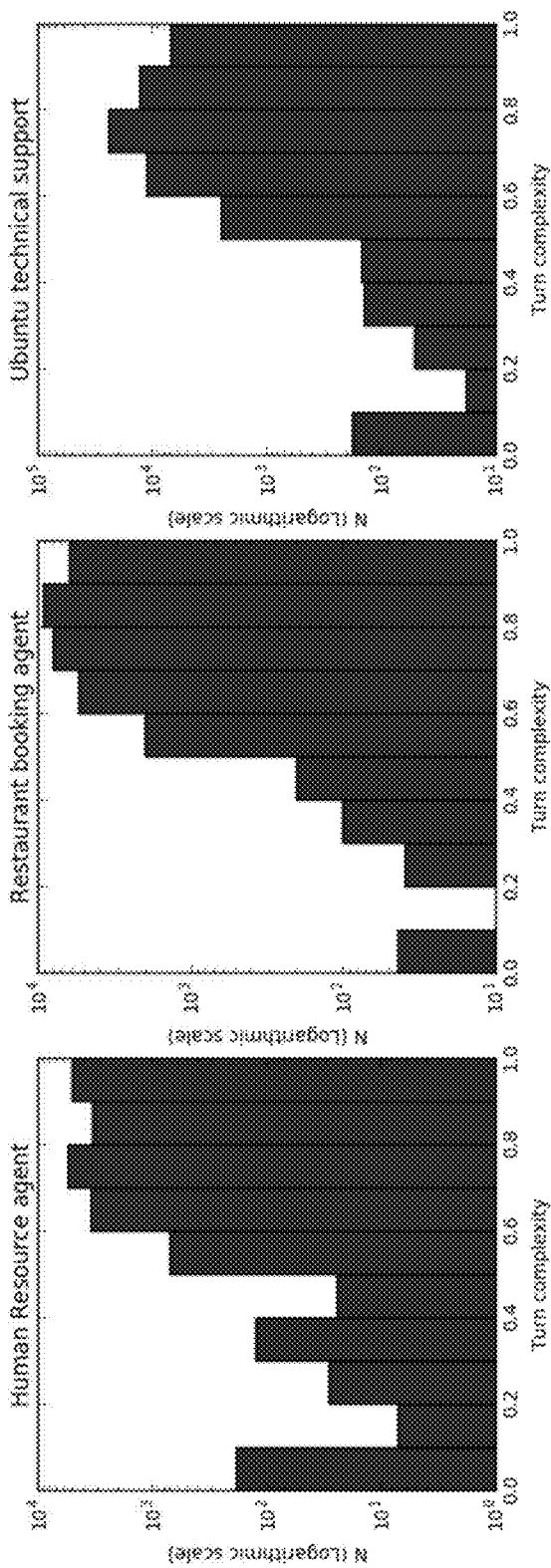
FIG. 2 exemplarily depicts a distribution of turn complexity in step 101 according to an embodiment of the present invention.

Dialog data is not uniform and so is the exhibited complexity. In FIG. 2, analysis on three dialog datasets is shown: Human Resources (HR), Restaurant booking and Ubuntu online technical support. We see that dialogues for Ubuntu technical support have lower average turn complexity. By examining random sample of dialogues, the reason can be determined as speakers' lower domain expertise in this case comparing to other more familiar topics. Dialogues of a Human Resource agent has more polarized distribution, with highest percentage at the low end of complexity. By examining dialogues in with low complexity, the reason can be determined as more frequent social chit-chat with the Human Resource agent.

In step 102, a reason for the complexity of the dialogue is determined. That is, rule-based interpretation of complexity differences or changes for underlying reasons. Possible rules include, for example, complexity due to language usage (i.e., high average utterance complexity due to domain expertise), complexity due to procedural structure (i.e., high average turn complexity due to intensive information requests (instead of chit-chat)), and complexity due to inherent domain difference (i.e., high average dialog complexity in a medical domain).

Thus, the reason for calculated values of dialog complexity is explainable using rules, where the rules cover language; structure of dialog in terms of constituent turns, utterances and words; domain of conversation, and understandability consideration like inference chain.

In step 103, a service handling is managed based on the measured complexity of the dialogue and the reason for the complexity of the dialogue. For example, choice of handlers, system modules, and repository can be decided. That is, in step 103, service handling flow is managed based on dialog complexity, performance of service agents can be assessed, and system components can be selected based on complexity.

For example, a customer support center can have M agents. An agent $a_j$ handles $Na_j$ dialogs in time $Ta_j$. A function $\varphi(di)$ is given to find the customer's satisfaction (C-SAT) with a dialog $d_i$ and its complexity is measured by function $c(d_i)$. The problem is to assess the performance of a support center's agent, represented as $\omega(a_j)$. Thus, $\omega(a_j)$ is defined by Equation 6. Here, the customer rating of an interaction is weighted with its complexity and duration, and averaged over the whole duration that an agent has to be evaluated. The result is a number which will be between 0-1 if c and C-SAT are in that range. Now even agents who work over different time periods (Ti) and nature of dialogs can be compared.

$$\omega_3(a_j) = \frac{1}{T_{a_j}} * \left( \sum_{i=1}^{N_{a_j}} c(d_i) * \phi(d_i) * t_i \right) \quad (6)$$

Thereby, step 103 can provide a technique to handle a service request at each turn based on dialog complexity, to rank a set of service handlers based on dialog complexity, to rank dialogs based on dialog complexity, and to enhance and improve ground truth acquisition for a dialog system.

For example, a handler model can be provided for a turn in which an automated handler has a value of 1 with a cost of 0.7 and a success rate of (if partial dialogue complexity<0.5), 0.9; else 0.1 and a human has a value of 1, a cost of 1, and a success rate of 1. In other words, the automated response has a high success rate when the complexity of the dialogue is low. In step 103, the balance between the automated response and the human response is computed to maximize the return function. In other words, an optimization problem can be set up where Maximize $\Sigma_{Expected\ remainder\ dialog\ turns\ i}$ Expect(Value$_i$−Cost$_i$).

Figure 3:
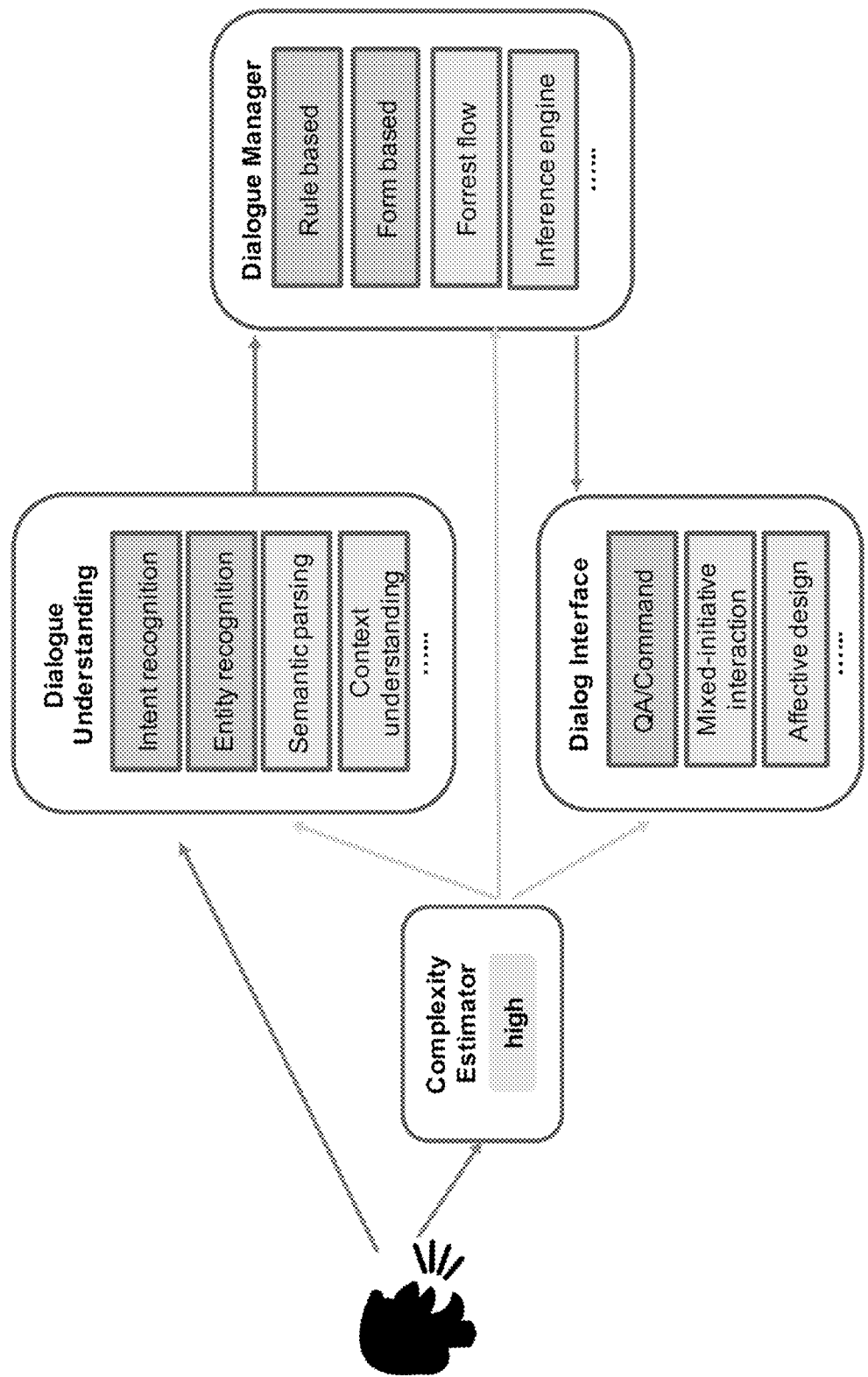
FIG. 3 exemplarily depicts an adaptive system architecture according to an embodiment of the present invention.

FIG. 3 shows an application of dialog complexity metric for managing dialogs that a system has with a person. In this example, the system has a number of alternative components at each stage of processing: dialog interface, dialog understanding and dialog management. A computational dialogue system can determine which modules to be used for a user or for a task based on the complexity of dialogues a user is conducting. The estimation can be made from either real-time incoming dialogues, or historical data of the user or the task. When the dialogue complexity reaches certain threshold, it can be determined that certain costly modules should be used. When below the threshold, these modules may be excluded to balance cost. The cost may include, but should not be limited to, development cost and running cost. The more costly modules may include, but should not be limited to, semantic parsing in understanding user input, inference engine for dialogue management, and mixed-initiative interaction in dialogue system interface.

Figure 4:
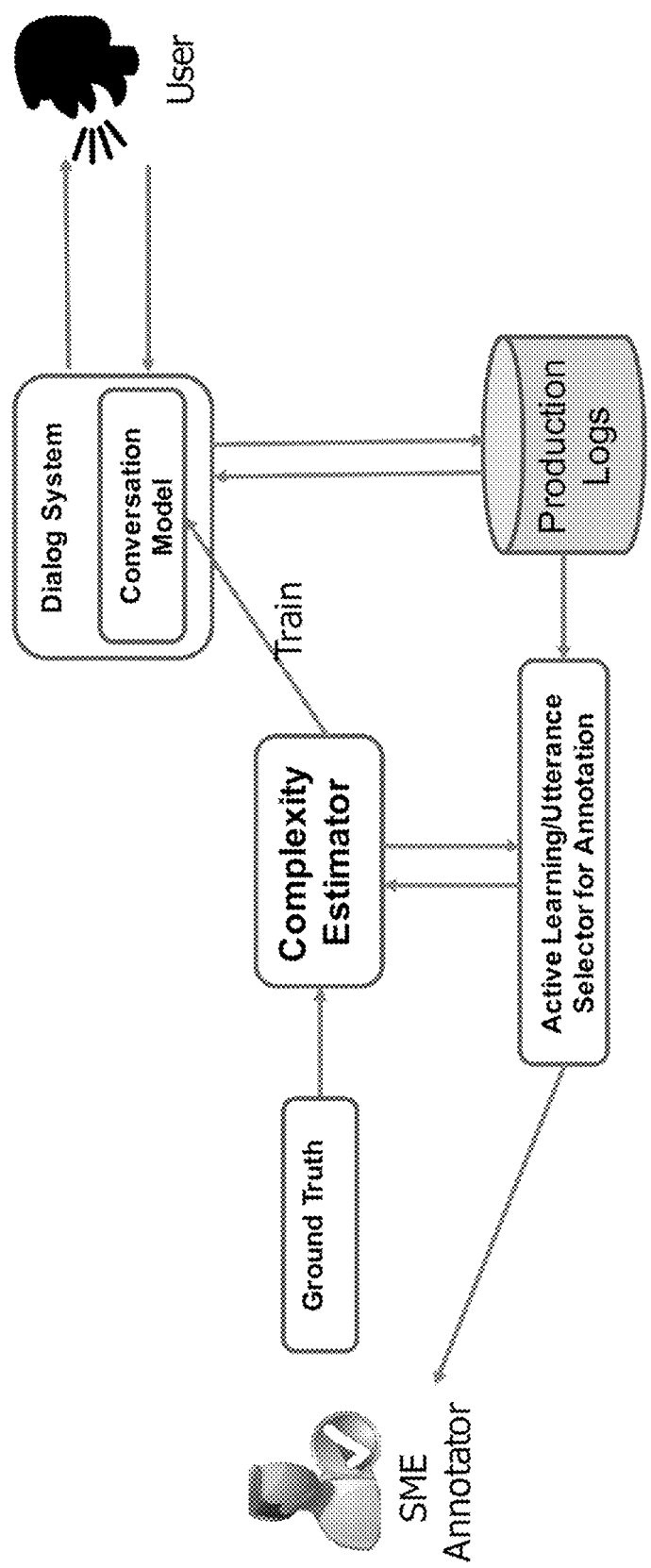
FIG. 4. exemplarily depicts ground truth acquisition according to an embodiment of the present invention.

FIG. 4 shows another application of dialog complexity metric, this time to help a dialog system built using machine learning. Most such dialog systems that utilize machine learning techniques are supervised. An important task of supervision is annotation of utterances to train a machine learning model (conversation model). The annotation is performed by domain experts by mapping/labeling utterances from users to appropriate responses. However, selecting utterances to be labeled from a large pool of unlabeled utterances is critical to build an accurate conversational model. A prominent technique for selecting data points and re-training the machine learning models, that includes conversational models, is Active Learning. In such scenarios, in one embodiment, the complexity measure in conjunction with other features such as confidence (the probability of machine learning classifier to classify the utterance) can be used to select utterances from unlabeled set to be annotated. The selection process will now have the ability to learn the range of complexity scores for utterances to be labeled to improve the performance of the conversation model.

Thus, the method 100 can directly use a dialogue corpus to automatically learn (extract) domain specific terms and uses them along with language (English) terms and keywords for complexity calculation. This makes the calculation an automatic process without need for input content markers. Also, the method 100 can generate complexity scores at multiple levels of dialog to facilitate interpretations of complexity and enable correspondence in system development and in addition to content-based calculation, the invention can also calculate complexity based on machine learning methods, by taking user utterance as input, assuming labeled data is available. The invention uses rules to explain reason for dialog complexity, where the rules cover language of dialog, domain of conversation, and understandability of content measured by their uniqueness to domain. Also, the invention can measure complexity based on variance in volume of content, date and time of content recording and its applicability, sentiment of participants (human or agents).

The embodiment of the proposed method was implemented and run on public dialog datasets. The average calculated complexity for them at different levels are shown below. It helps all stakeholders take better decisions customized to characteristics of the datasets.

|            | M (utt.) | M (turn) | M (dialog) |
|------------|----------|----------|------------|
| Ubuntu     | 0.767    | 0.767    | 0.407      |
| Insurance  | 0.789    | 0.789    | 0.894      |
| HR         | 0.801    | 0.803    | 0.423      |
| Restaurant | 0.788    | 0.788    | 0.518      |

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 5, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
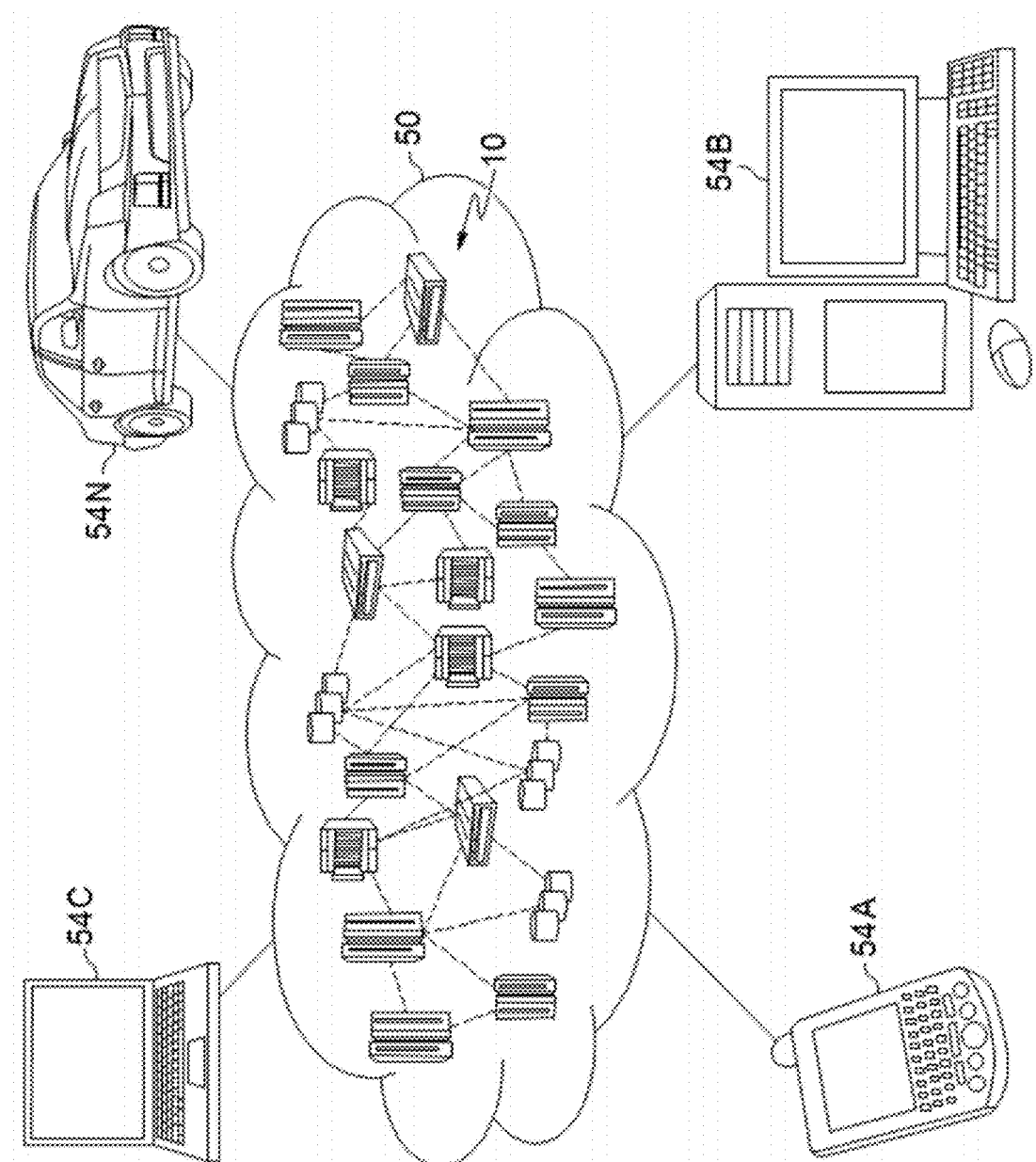
FIG. 6 depicts a cloud-computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
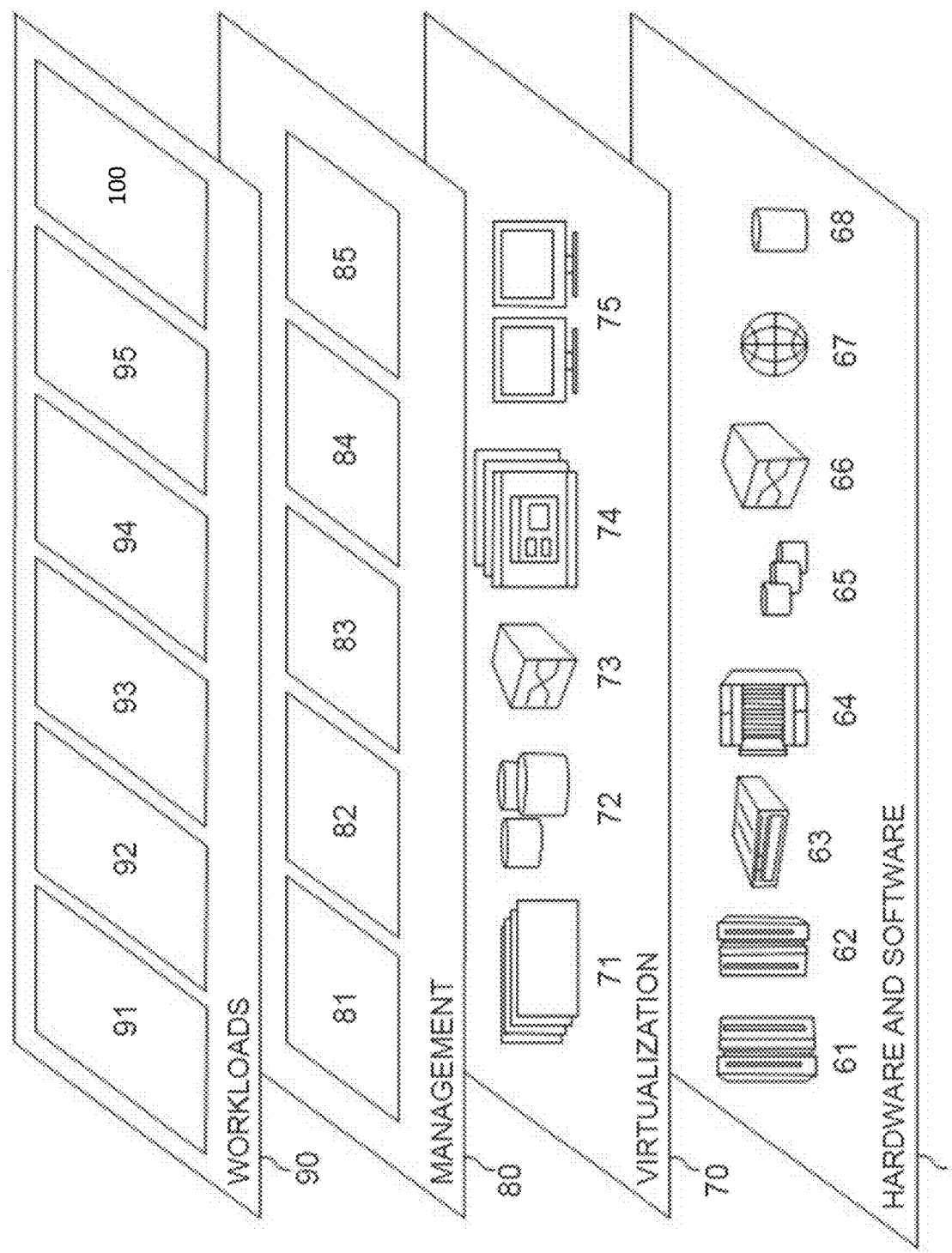
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dialogue complexity assessment method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented dialogue complexity assessment method, the method comprising:
    calculating a complexity of a dialogue in stages by:
        computing a complexity of the dialogue at an utterance level;
        computing a complexity of the dialogue at a turn level; and
        computing a complexity of the dialogue based on the complexity of the constituent turns and utterances,
    wherein the dialogue is from dialogue data from online repositories and contact centers of service providers.

2. The computer-implemented method of claim 1, further comprising determining a reason for the complexity of the dialogue, and
    wherein the complexity is computed by computing the complexity of the dialogue at the dialogue level based on the utterance level complexity and the turn level complexity.

3. The computer-implemented method of claim 2, wherein the determining further includes determining rules to explain a reason for dialogue complexity, the rules including a language of the dialogue, a domain of a conversation of the dialogue, and an understandability of a content measured by their uniqueness to the domain.

4. The computer-implemented method of claim 1, further comprising managing a service handling based on the calculated complexity of the dialogue.

5. The computer-implemented method of claim 4, wherein the managing determines how a service request is handled at each turn based on the calculated complexity of the dialogue.

6. The computer-implemented method of claim 1, further comprising ranking a set of service handlers based on the calculated complexity of the dialogue.

7. The computer-implemented method of claim 1, wherein the complexity uses an N-gram structure.

8. The computer-implemented method of claim 1, wherein a customer rating of an interaction is weighted with the calculated complexity of the dialogue and a duration of the dialogue, and averaged over a whole duration that an agent is to be evaluated during the dialogue to determine an agent score for a service handler.

9. The computer-implemented method of claim 6, wherein the service handlers are managed by at least one of:
    ranking a set of the service handlers;
    assigning an agent to handle service requests;
    ranking dialogues in a corpus based on the calculated complexity of the dialogue; and
    improving an acquisition of a ground truth for a dialogue system.

10. The computer-implemented method of claim 1, embodied in a cloud-computing environment.

11. The computer-implemented method of claim 1, wherein the utterance level, the turn level, and the complexity of the dialogue are calculated and directly used as a dialogue corpus to automatically learn the domain-dependent terms and the domain-independent terms and uses them along with language terms and keywords for the complexity calculation.

12. A computer program product for dialogue complexity assessment, the computer program product comprising a computer readable storage medium having program instructions embodied therewith, the program instructions executable by a computer to cause the computer to perform:
    calculating a complexity of a dialogue in stages by:
        computing a complexity of the dialogue at an utterance level;
        computing a complexity of the dialogue at a turn level; and
        computing a complexity of the dialogue based on the complexity of the constituent turns and utterances,
    wherein the dialogue is from dialogue data from online repositories and contact centers of service providers.

13. The computer program product of claim 12, further comprising determining a reason for the complexity of the dialogue, and
    wherein the complexity is computed by computing the complexity of the dialogue at the dialogue level based on the utterance level complexity and the turn level complexity.

14. The computer program product of claim 13, wherein the determining further includes determining rules to explain the reason for dialogue complexity, the rules including a language of the dialogue, a domain of a conversation of the dialogue, and an understandability of a content measured by their uniqueness to domain.

15. The computer program product of claim 12, further comprising managing a service handling based on the calculated complexity of the dialogue.

16. The computer program product of claim 15, wherein the managing determines how a service request is handled at each turn based on the calculated complexity of the dialogue.

17. The computer program product of claim 12, further comprising ranking a set of service handlers based on the calculated complexity of the dialogue.

18. The computer program product of claim 12, wherein the complexity uses an N-gram structure.

19. A dialogue complexity assessment system, said system comprising:
a processor; and
a memory, the memory storing instructions to cause the processor to perform:
calculating a complexity of a dialogue in stages by:
computing a complexity of the dialogue at an utterance level;
computing a complexity of the dialogue at a turn level; and
computing a complexity of the dialogue based on the complexity of the constituent turns and utterances,
wherein the dialogue is from dialogue data from online repositories and contact centers of service providers.

20. The system of claim 19, embodied in a cloud-computing environment.

* * * * *